Fig. 6.

April 8, 1930.  R. DE COURSEULLES  1,753,850
LOADING DEVICE FOR SEMIAUTOMATIC NAVAL GUNS
Filed April 16, 1928   9 Sheets-Sheet 6

Fig. 2.

Inventor
Robert De Courseulles
By
Cameron, Kerkam & Sutton
Attorneys

Fig. 8.

April 8, 1930.  R. DE COURSEULLES  1,753,850
LOADING DEVICE FOR SEMIAUTOMATIC NAVAL GUNS
Filed April 16, 1928    9 Sheets-Sheet 9

Inventor
Robert De Courseulles
By
Cameron, Kerkam & Sutton
Attorneys

Patented Apr. 8, 1930

1,753,850

UNITED STATES PATENT OFFICE

ROBERT DE COURSEULLES, OF PARIS, FRANCE, ASSIGNOR OF ONE-HALF TO SCHNEIDER & CIE., OF PARIS, FRANCE, A LIMITED JOINT-STOCK COMPANY OF FRANCE, AND ONE-HALF TO COMPAGNIE DES FORGES ET ACIERIES DE LA MARINE ET D'HOMECOURT, A LIMITED JOINT-STOCK COMPANY OF PARIS, FRANCE

LOADING DEVICE FOR SEMIAUTOMATIC NAVAL GUNS

Application filed April 16, 1928, Serial No. 270,433, and in France June 22, 1927.

The present invention relates to a loading device for semi-automatic naval guns.

The invention is essentially characterized by the feature that the new apparatus comprises a frame in the form of a stirrup or yoke the arms of which are pivotally connected to projections on trunnions of the cradle, one of the arms bearing a pivot for the loading tray for the projectile, and the base of the stirrup, which is situated at a sufficient distance from the rear face or edge of the gun barrel in order to permit the free recoil of the latter, forming a support for two parallel troughs adapted to receive the cartridges, one of these troughs having its axis in alignment with the axis of the gun marrel, so as to serve alternately for receiving a live cartridge which will be pushed in behind the projectile and to receive the spent cartridge ejected after the shot has been fired, while the parallel trough receives a new cartridge in preparation for the next loading operation.

This new device is, in one particular embodiment, combined with a mechanism for driving in the projectile, which mechanism is characterized by the association of an oscillating trigger action ram of known type with the loading tray, for the projectile, the pivotal movement of the loading tray for bringing the projectile into alignment with the bore of the gun barrel causing the ram to move automatically from the withdrawn position in the operative position.

In its practical form of construction the invention further comprises a device for completing by means of a lever operated driving member, pivoted to the gun carriage cradle, the ramming in of the cartridge which has been commenced by hand, the return of the driver into its position of rest producing the automatic closure of the breech.

The association of this loading apparatus with a gun barrel comprising a lateral groove and a wedge breech block enables the complete loading operations to be executed very rapidly and in a sufficiently small space behind the gun. In fact, in practice, the new loading apparatus only presents all its advantages when it is combined with the gun arrangement having a lateral groove and a wedge breech block shown in the drawing.

These particular embodiments are illustrated by way of example, in the accompanying drawing, in which—

As shown more particularly in Figs. 3, 6, 7, 8 and 9, the gun barrel 1 is provided at the rear end with a lateral groove 1', which extends from the rear of the chamber as far as the back face or edge of the barrel and permits, when the breech is opened, the engagement of the projectile from the side in a position in which the nose of the said projectile is situated in the immediate neighbourhood of the back face of the chamber. This construction enables the loading apparatus according to the invention to be constructed in such a way that the cartridge to be driven in is in the ready position behind the projectile to be driven in, without the loading apparatus, in its entirety, occupying too large an amount of space behind the gun barrel.

In the various figures, 2 is the cradle adapted to turn in the gun carriage on the trunnions 3; 4 is a wedge closing breech block of known type; in the drawing, 5 indicates the maximum angle of elevation of the gun barrel obtainable by swinging the cradle.

Figure 1:
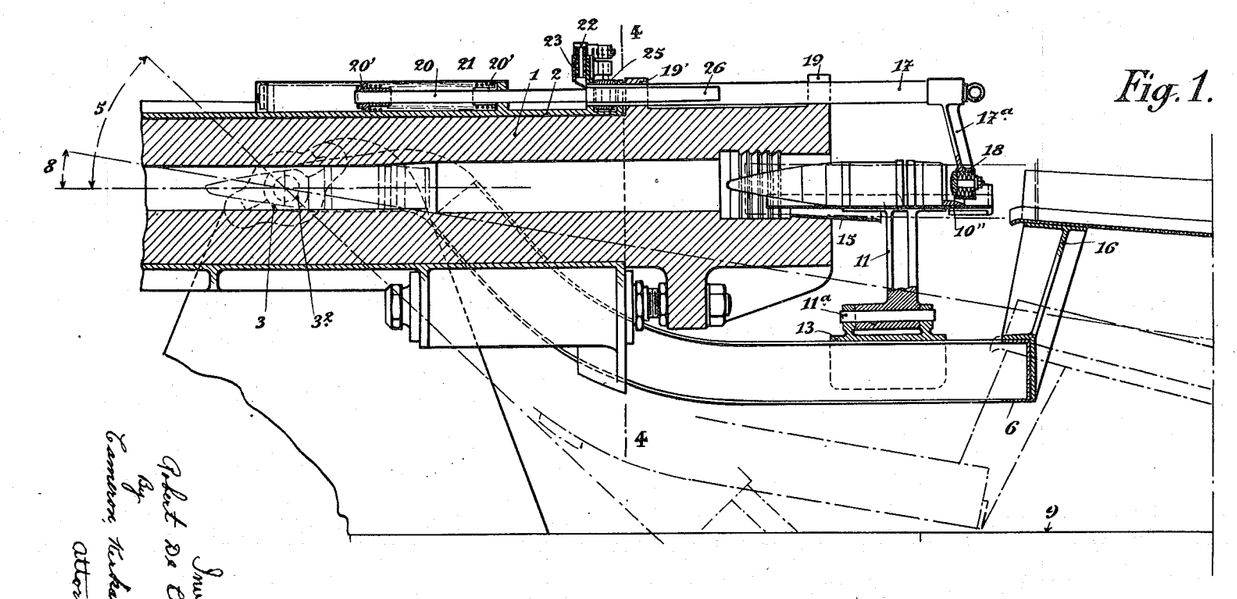
Fig. 1 is a longitudinal sectional elevation taken along the axis of the gun barrel, the members being shown at the commencement of the operation of ramming in the projectile.
Figure 2:
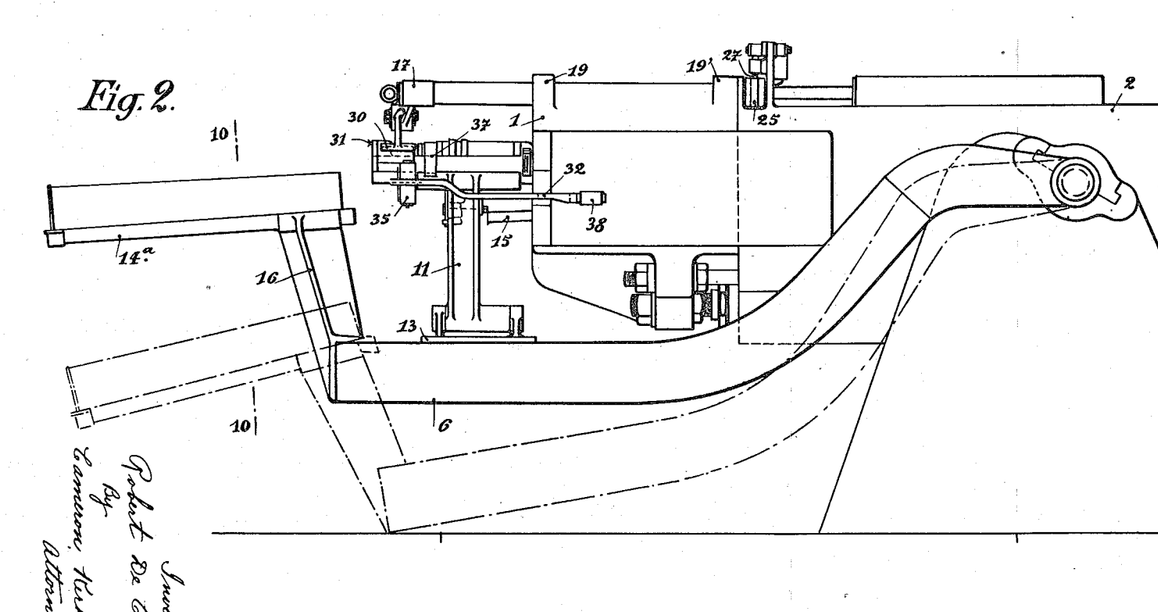
Fig. 2 is a longitudinal elevation of the gun viewed from the right hand side, the members being in the position occupied when the gun has returned into battery position after the projectile has been fired, the return into battery position having cocked the oscillating trigger action ram.

According to the invention, the loading apparatus comprises a frame 6 in the form of a stirrup, the arms of which are pivoted about pivots 3' formed upon the trunnions of the cradle and on the axis of the latter. The base of the support 6 is sufficiently distant from the rear face of the gun barrel when in battery position to permit a suitable recoil of the latter. It acts as support through the medium of a bracket 16 for a pair of troughs 14, 14ª in one, 14, of which a gun servant will always place a cartridge, in readiness. The other trough 14ª, the axis of which is in alignment with the axis of the gun barrel, will alternately receive the live cartridge to be driven in and the spent cartridge ejected after each firing operation. To one of the arms of the frame is pivoted, in a support 13 and about a pivot 11ª parallel to the axis of the gun barrel, an arm 11 carrying the projectile loading tray 10. The whole arrangement formed by the frame, the cartridge troughs and the pivoting projectile tray rests upon a stop 7 (Figure 4) formed upon the cradle, for as long as the angle of elevation is smaller than the angle 8 (Figure 1). As soon as the angle of elevation exceeds this value the frame 6 bears upon the operating platform 9, as shown in dot and dash lines in Figure 1, and the oscillating mass proper is lowered alone. The projectile tray occupies, during firing, the position indicated in full lines at 10' in Figs. 3, 5, 7, 8 and 9, upon the left side of the gun barrel. A spring bolt 12 keeps it locked in this position by its engagement upon a flange 13ª of the support 13. 12ª is an operating handle which a gun servant actuates in order to bring the tray 10, loaded with a projectile, into the loading position. By operating the handle 12ª in order to make the arm 11 turn, the gun servant automatically disengages the bolt 12. At rest the handle 12ª abuts by means of a beak against the tappet 11ᵇ formed as a projection upon the arm 11 (Figure 3). 15 is a plate carried by the gun barrel and forming a projection upon the rear face of the latter. It assists the cartridges to pass over the space between the rear face of the gun barrel and the trough or gutter 14ª.

The movements of the projectile tray are, according to the invention, operatively connected with those of an oscillating trigger action ram of known type and formed for example, as shown in the drawings, by a bent bar 17—17ª, carrying at the end of the arm 17ª a spring buffer 18, while the arm 17 slides in a guide 19—19' formed upon the gun barrel. A part 20 of smaller diameter of the bar 17 carries a series of sleeves 20' forming a bearing for springs 21 which are kept under tension for as long as the bar 17—20 is itself held in the position shown in Figure 1 by a spring bolt 22—23 movable in a lodgment provided in the cradle.

As will be shown hereinafter the springs 21 are put under tension by the movement of recoil of the gun barrel and remain under tension until the bolt 22 is disengaged.

Figure 6:
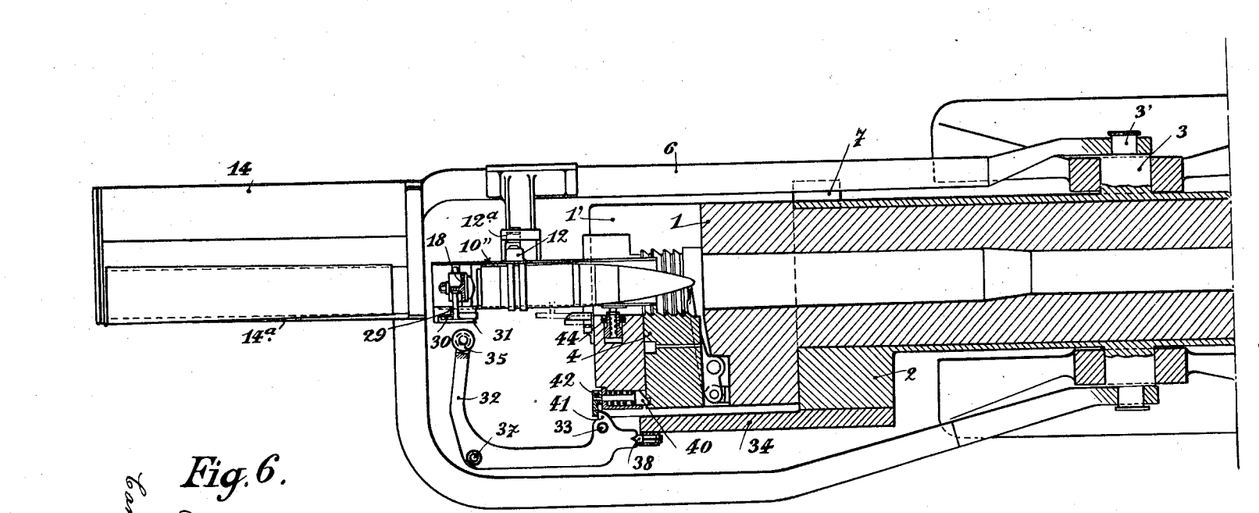
Figs. 6, 7, 8 and 9 are plan sections taken along the axis of the gun barrel showing the members in various working positions.

When it is desired to proceed with the loading, the gun being assumed to have been laid and the breech to be open, and the spring of the projectile ram, stressed by hand or mechanically for the first shot, and then automatically for subsequent shots fired, a gun servant by operating the handle 12ª, moves the projectile tray from the position 10' (Figure 3) into the position 10" (Figures 6 and 12) in which the arm 11 is stopped by abutting against a spring buffer 44 disposed in the gun barrel (Figure 6).

During its pivotal movement from the position 10' to the position 10" the projectile tray moves, by means of a guide 31, a pin 30 carried by a tailpiece 29 formed as a projecton upon the arm 17ª of the ram. The latter is thus carried into the position shown in dot and dash lines in Fig. 3 while the projectile tray hooks below a spring latch 43 pivoted to the gun barrel (Figure 12).

The arrival of the ram 17 into the position shown in dot and dash lines, in which the buffer 18 is in alignment with the axis of the gun barrel and opposite the base of the projectile placed upon the tray 10", causes the bolt 22 to be disengaged and this disengagement is produced on account of the fact that a cam 25, in which the rod 17 is adapted to slide by means of flats 26, and which is carried along in a movement of rotation of the said rod, raises a rod 27 (Fig. 4) and through the latter a lever 28 which causes the bolt 22 to rise. The spring 21, by expanding, provokes the longitudinal displacements of the ram 17ª, 17, 20 which slides by means of its flats 26 in the cam 25. The projectile is thus driven into the bore of the gun barrel and projected into the position shown in dot and dash lines in Fig. 1. At the end of its ramming movement the pin 30 carried by the arm 17ª acts upon the latch 43 so as to disengage the latter and release the projectile tray previously held engaged (Figs. 3 and 12).

Figures 3, 4, 12:
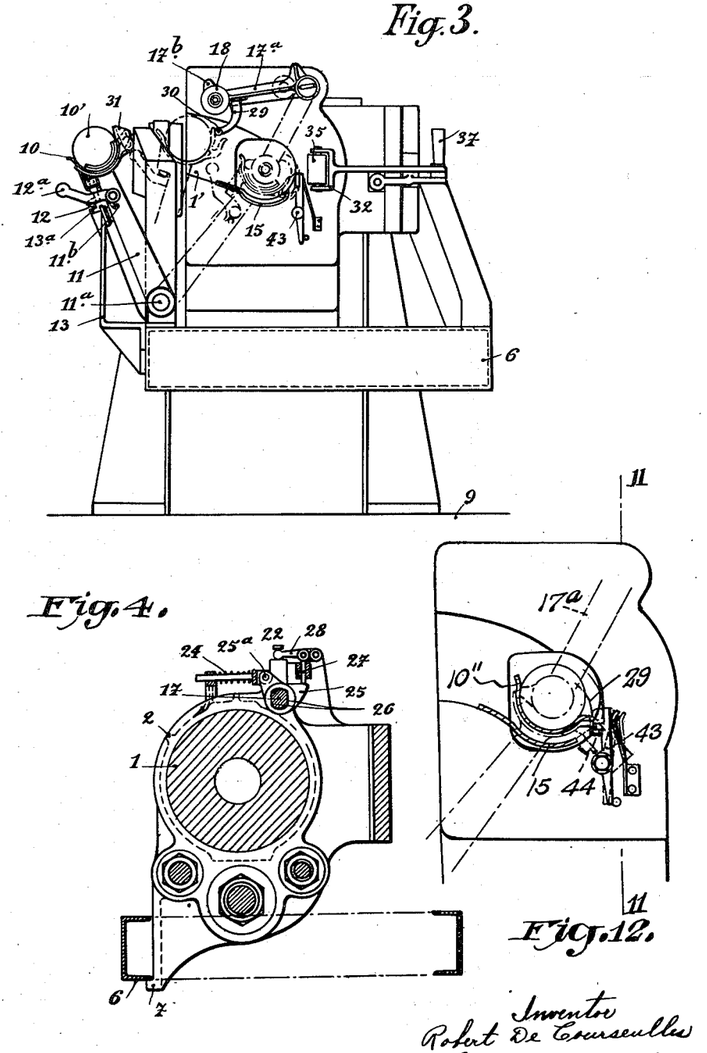
Fig. 3 is a rear elevation showing in full lines the loading tray for the projectile and the ram for the latter in the withdrawn position, these members being shown in dot and dash lines in the ramming position.
Fig. 4 is a sectional elevation taken along the line 4—4 of Fig. 1.
Figs. 11 and 12 are detail views of the locking of the projectile tray in the loading position.
Figure 5:
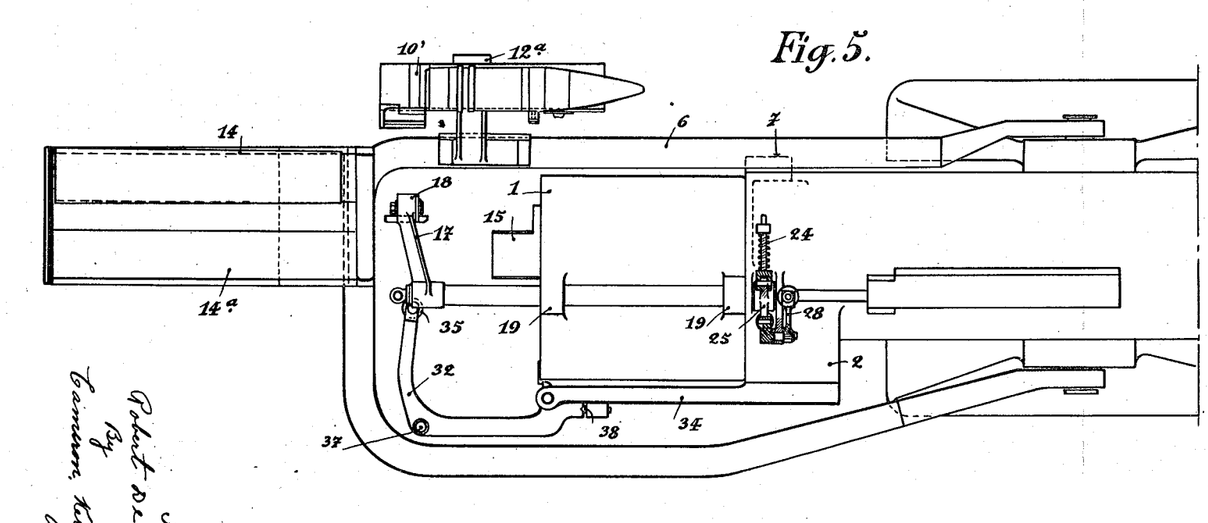
Fig. 5 is a plan view corresponding to Fig. 2.

The arm 25ª, which may be rigid with the cam 25, actuates a pusher in order to compress a return spring 24 (Fig. 4) which constantly tends to return the ram 17ª—17 into its position of rest shown in full lines in Fig. 3. During the ramming stroke of the projectile the beak 17ᵇ of the arm 17ª is guided and pressed by the spring 24 against the wall of the plate 10 as shown in dot and dash lines in Figs. 3 and 12. When the ramming in is completed, the latch 43 being disengaged, the gun servant by operating the handle 12ª, returns the projectile tray into the position 10'. The beak 17ᵇ is thus withdrawn from contact with the tray and as soon as it escapes from the latter it is returned by the action of the spring 24 into its position of rest.

Figure 7:
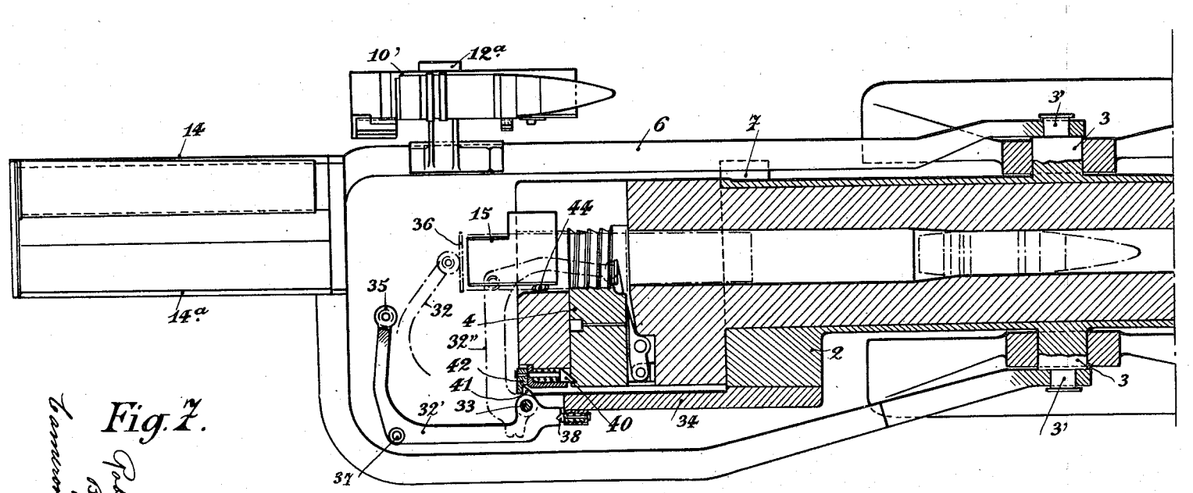
Figure 8:
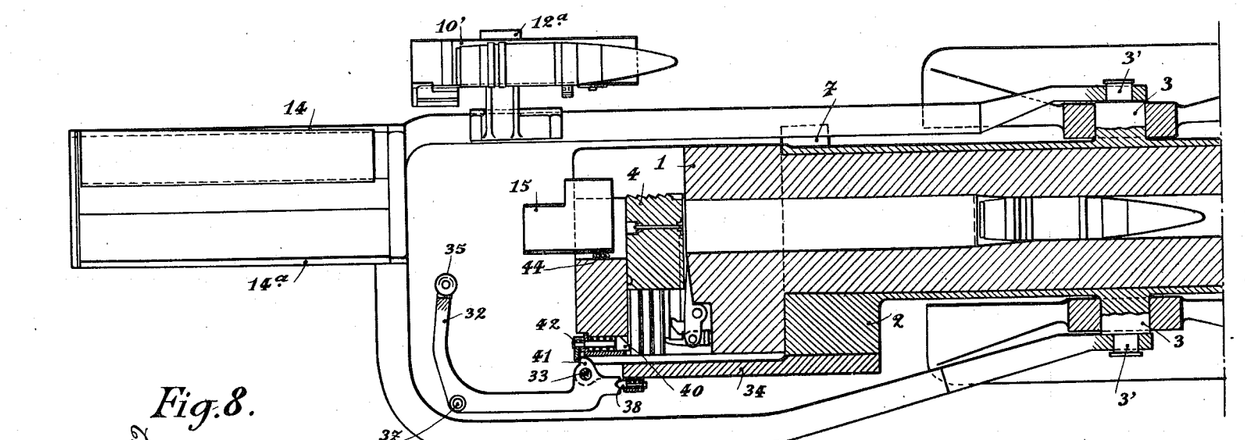
Figure 9:
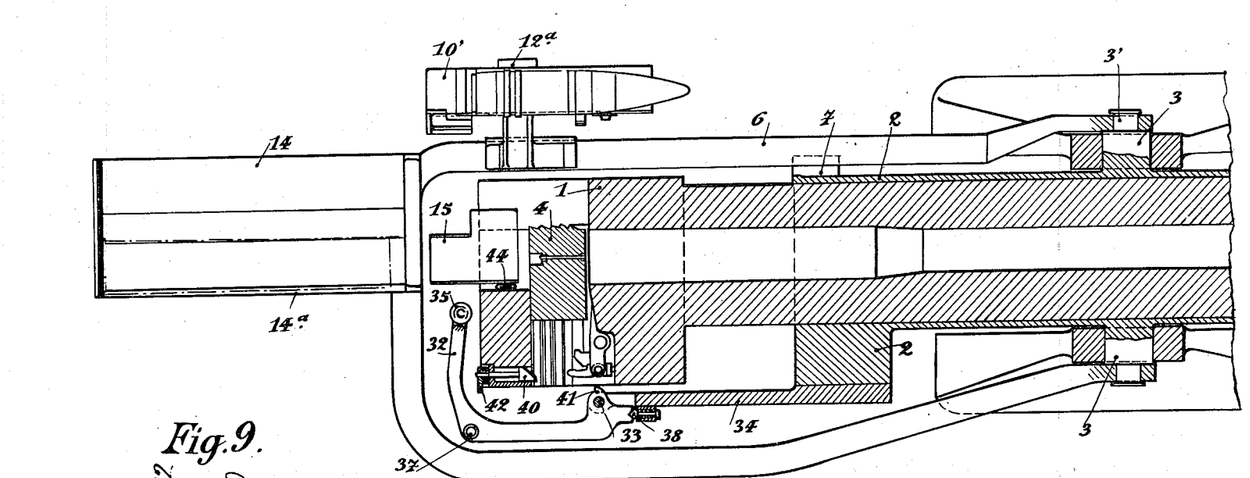
Figure 10:
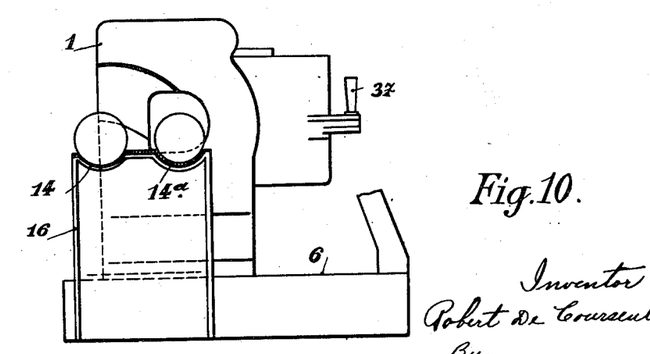
Fig. 10 is a sectional view of detail taken along the line 10—10 in Fig. 2.
Figure 11:
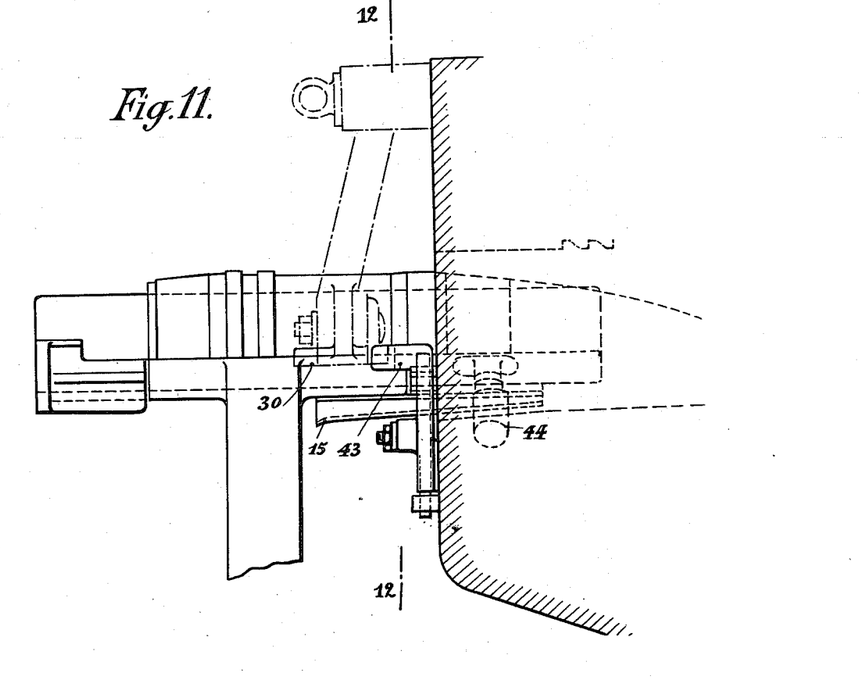

A new cartridge taken from the trough 14 is loaded into the trough 14ª and moved by hand onto the plate 15 in the position shown in dot and dash lines in Fig. 7. The cartridge is driven in by means of a driving member pivoted about a pivot 33 mounted upon a support 34 secured to the cradle 2. By means of a handle 37 (Figs. 3 and 7) a gun servant actuates the driver which, by means of a rubber roller 35, presses upon the base of the cartridge 36. In the position of rest 32' indicated in full lines in Fig. 7 the driver is held by a bolt 38 which is automatically withdrawn when the said driver is made to pivot. When the cartridge has been completely pushed into the chamber of the gun barrel the gun servant returns the driver from the position 32'' to the position of rest 32' taking care to pass slightly beyond the position of engagement so as to disengage, by means of a stud 41 acting upon the head 42, a spring bolt 40, and thus release the breech plug 4 the automatic closure of which is then secured by known means. For each shot fired, upon the recoil of the gun barrel the ram 17ª, is carried along, the effect of which is to stress the spring 21. At the termination of the recoil, when the movement of reentry into battery position commences, the bar 17 moves to abut against the beak of the bolt 22. The opening of the breech is operated automatically by known means, either at the end of the recoil or at the commencement of the reentry into battery position, the loading operations being, if desired, recommenced and completed as described above, a gun servant bringing a new cartridge, which was in readiness in the trough 14, into the trough 14ª after the spent cartridge previously ejected in the known manner and thrown upon the trough 14ª has been removed by the gun servant.

I claim:

1. Loading apparatus for guns comprising, in combination with a gun and cradle and trunnions therefor, a frame pivoted about the trunnion axis, a projectile tray pivotally mounted on said frame about an axis substantially perpendicular to the trunnion axis and adapted to swing into loading position, a cartridge tray carried by said frame, and a stop on said cradle supporting said frame.

2. Loading apparatus for guns comprising, in combination with a gun and trunnions therefor, a frame pivoted about the trunnion axis, and a projectile tray pivotally mounted on said frame about an axis substantially perpendicular to said trunnion axis and adapted to swing into loading position, said gun having a lateral groove at its end to receive said projectile tray whereby the projectile may be alined with the gun barrel.

3. Loading apparatus for guns comprising, in combination with a gun and trunions therefor, a frame pivoted about the trunnion axis, a projectile tray pivotally mounted on said frame about an axis substantially perpendicular to said trunnion axis and adapted to swing into loading position, and a ramming device automatically released by movement of said tray into loading position.

4. Loading apparatus for guns comprising, in combination with a gun and trunnions therefor, a frame pivoted about the trunnion axis, a projectile tray pivotally mounted on said frame about an axis substantially perpendicular to said trunnion axis and adapted to swing into loading position, a rotatable and longitudinally displaceable rammer mounted on said gun, means for preventing longitudinal displacement of said rammer in one position of rotation, and an arm on said rammer extending into the path of movement of said tray, said rammer being rotated by movement of said tray to loading position to release it from said means.

5. Loading apparaus for guns comprising, in combination with a gun and trunnions therefor, a frame pivoted about the trunnion axis of said gun, a projectile tray pivotally mounted on said frame about an axis substantially perpendicular to said trunnion axis and adapted to swing into loading position, a rotatable and longitudinally displaceable rammer mounted on said gun, a spring-pressed pin normally locking said rammer against longitudinal displacement, an arm on said rammer extending into the path of movement of said tray, and a cam on said rammer adapted to displace said pin to release said rammer on rotation of said rammer.

6. Loading apparatus for guns comprising, in combination with a gun and trunnions therefor, a frame pivoted about the trunnion axis, a projectile tray pivotally mounted on said frame and adapted to swing into loading position, a ramming device for said projectile automatically released by movement of said tray into loading position, and a cartridge tray carried by said frame in the rear of said projectile tray.

7. Loading apparatus for guns comprising, in combination with a gun and trunnions therefor, a frame pivoted about th trunnion axis, a projectile tray pivotally mounted on said frame and adapted to swing into loading position, a ramming device for said projectile automatically released by movement of the tray into loading position, a cartridge tray carried by said frame, and means carried by said frame for ramming a cartridge into said gun.

8. Loading apparatus for guns comprising, in combination with a gun and trunnions therefor, a frame pivoted about the trunnion axis, a projectile tray pivotally mounted on said frame and adapted to swing into loading position, a ramming device for the projectile automatically released by movement of said tray into loading position, a cartridge tray carried by said frame in alinement with the gun barrel, and a manually operable cartridge rammer pivotally mounted on said frame.

9. Loading apparatus for guns comprising, in combination with a gun and trunnions therefor, said gun having a sliding breech block, a frame pivoted about the trunnion axis, a projectile tray pivotally mounted on said frame and adapted to swing into loading position, a ramming device for the projectile automatically released by movement of said tray into loading position, a cartridge tray carried by said frame, a cartridge rammer pivotally mounted on said frame, a locking pin for maintaining said breech block in open position, and a projection on said cartridge rammer adapted to displace said locking pin when said cartridge rammer is moved into inoperative position.

10. Loading apparatus for guns comprising, in combination with a gun and trunnions therefor, said gun having a sliding breech block, a frame pivoted about the trunnion axis, a projectile tray pivotally mounted on said frame and adapted to swing into loading position, a rotatable and longitudinally displaceable rammer mounted on said gun, means for preventing longitudinal displacement of said rammer in one position of rotation, an arm on said rammer extending into the path of movement of said projectile tray, said rammer being rotated by movement of said tray to loading position to release it from said means, a cartridge tray carried by said frame, a cartridge rammer mounted on said frame about a pivotal axis, a locking pin for maintaining said breech block in open position, and a projection on said cartridge rammer for displacing said pin when said cartridge rammer is moved to inoperative position.

11. Loading apparatus for guns comprising, in combination with a gun and trunnions therefor, a frame pivoted about the trunnion axis of said gun, a projectile tray pivotally mountd on said frame and adapted to swing into loading position, a rotatable and longitudinally displaceable rammer mounted on said gun, a spring-pressed pin normally locking said rammer against longitudinal displacement, an arm on said rammer extending into the path of movement of said projectile tray, a cam on said rammer adapted to displace said pin on rotation of said tray to loading position, a lock to retain said tray in loading position, and a projection on said rammer adapted to engage and release said lock.

In testimony whereof I have signed this specification.

ROBERT DE COURSEULLES.